US012671969B2

(12) United States Patent
Lucas Cruz et al.

(10) Patent No.: US 12,671,969 B2
(45) Date of Patent: Jun. 30, 2026

(54) EMERGENCY CALL REAL TIME TEXT (RTT) TO RTT EXCHANGE

(71) Applicant: T-Mobile USA, Inc., Bellevue, WA (US)

(72) Inventors: Jenniffer F. Lucas Cruz, Bellevue, WA (US); Oliver Rankine, Bellevue, WA (US); Gladys Martinez-Herrera, Monroe, WA (US); Robert E. Golden, Liverpool, NY (US)

(73) Assignee: T-Mobile USA, Inc., Bellevue, WA (US)

( * ) Notice: Subject to any disclaimer, the term of this patent is extended or adjusted under 35 U.S.C. 154(b) by 480 days.

(21) Appl. No.: 18/331,061

(22) Filed: Jun. 7, 2023

(65) Prior Publication Data

US 2024/0414512 A1 Dec. 12, 2024

(51) Int. Cl.
*H04W 4/90* (2018.01)
*H04W 4/12* (2009.01)

(52) U.S. Cl.
CPC .............. *H04W 4/90* (2018.02); *H04W 4/12* (2013.01)

(58) Field of Classification Search
CPC ............. H04M 3/5231; H04M 3/5116; H04M 2203/2005; H04W 76/50; H04W 72/121
See application file for complete search history.

(56) References Cited

U.S. PATENT DOCUMENTS

| | | | | |
|---|---|---|---|---|
| 2011/0064205 A1* | 3/2011 | Boni | ...................... | H04M 11/04 |
| | | | | 379/45 |
| 2016/0337908 A1* | 11/2016 | Poikselka | ............. | H04W 76/50 |
| 2021/0127351 A1* | 4/2021 | Stojanovski | .......... | H04W 48/16 |
| 2022/0295252 A1* | 9/2022 | Malone | ................. | H04W 76/11 |

* cited by examiner

*Primary Examiner* — Congvan Tran
(74) *Attorney, Agent, or Firm* — Foley IP Law, PLLC

(57) ABSTRACT

Emergency calls that use real time text (RTT) in addition to audio face a challenge: between an originating endpoint (e.g., a cellular network) sending a session initiation protocol (SIP) invite and receiving the response (e.g., 200 OK) from a downstream terminating endpoint (e.g., a peering network), the media attribute fields associated with the text and audio data may become swapped. Three options are disclosed for dealing with this issue. (1) The originating endpoint may swap the protocol paths for the RTT and audio data so that the public safety answering point (PSAP) and the user equipment (UE) are able to communicate. (2) The originating endpoint may send a correction request to the terminating endpoint. (3) If default protocol paths are specified for RTT and audio, the originating endpoint uses the default protocol paths independently of whether the SIP invite or response specified the correct data type and protocol path association.

20 Claims, 9 Drawing Sheets

FIG. 2

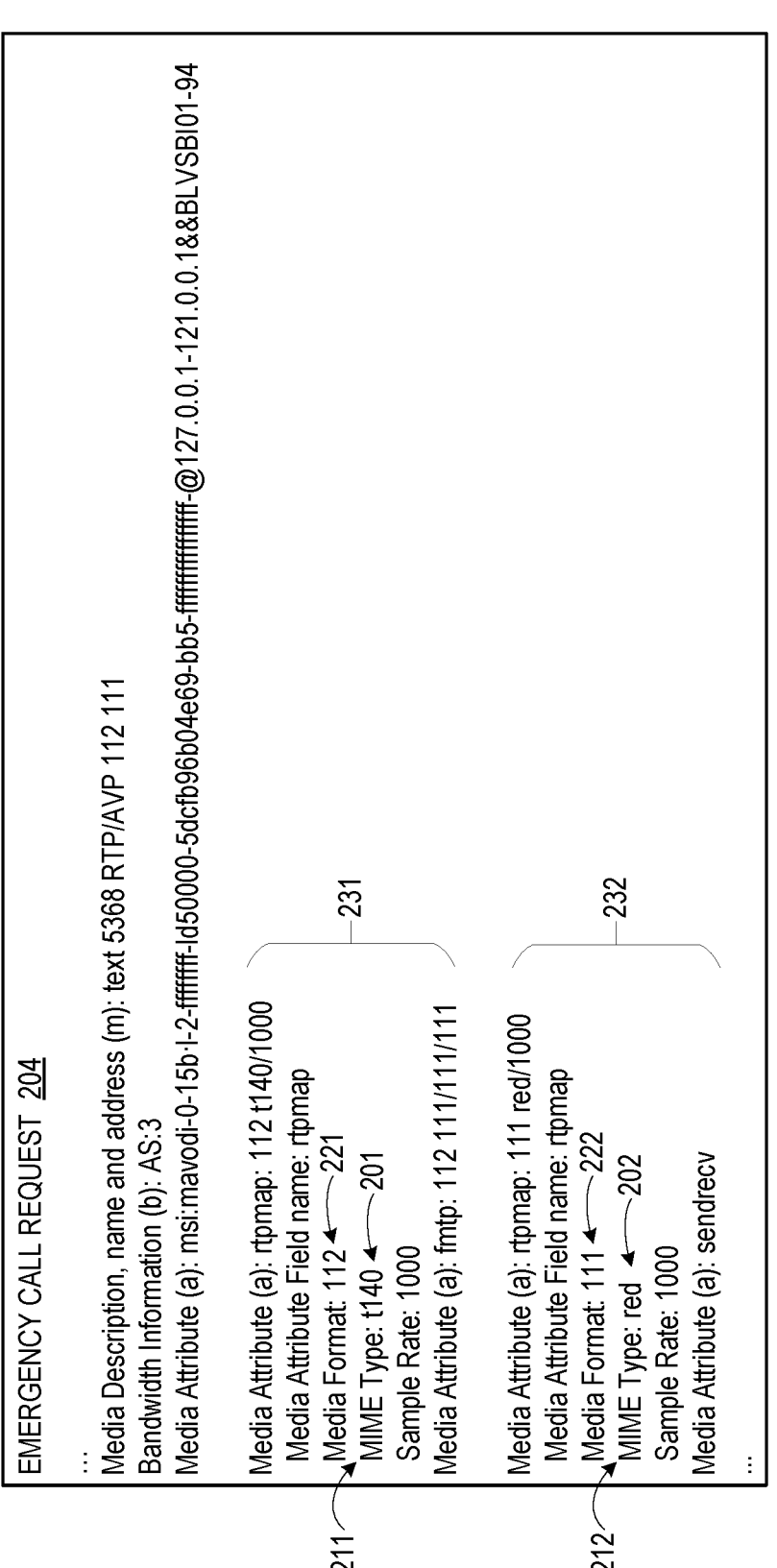

EMERGENCY CALL REQUEST 204

...

Media Description, name and address (m): text 5368 RTP/AVP 112 111

Bandwidth Information (b): AS:3

Media Attribute (a): msi:mavodi-0-15b·l-2-ffffffff-ld50000-5dcfb96b04e69-bb5-fffffffffffff-@127.0.0.1-121.0.0.1&&BLVSBI01-94

Media Attribute (a): rtpmap: 112 t140/1000
Media Attribute Field name: rtpmap
Media Format: 112 — 221
MIME Type: t140 — 201
Sample Rate: 1000
Media Attribute (a): fmtp: 112 111//111/111

}— 231

Media Attribute (a): rtpmap: 111 red/1000
Media Attribute Field name: rtpmap
Media Format: 111 — 222
MIME Type: red — 202
Sample Rate: 1000
Media Attribute (a): sendrecv

Figure 6:
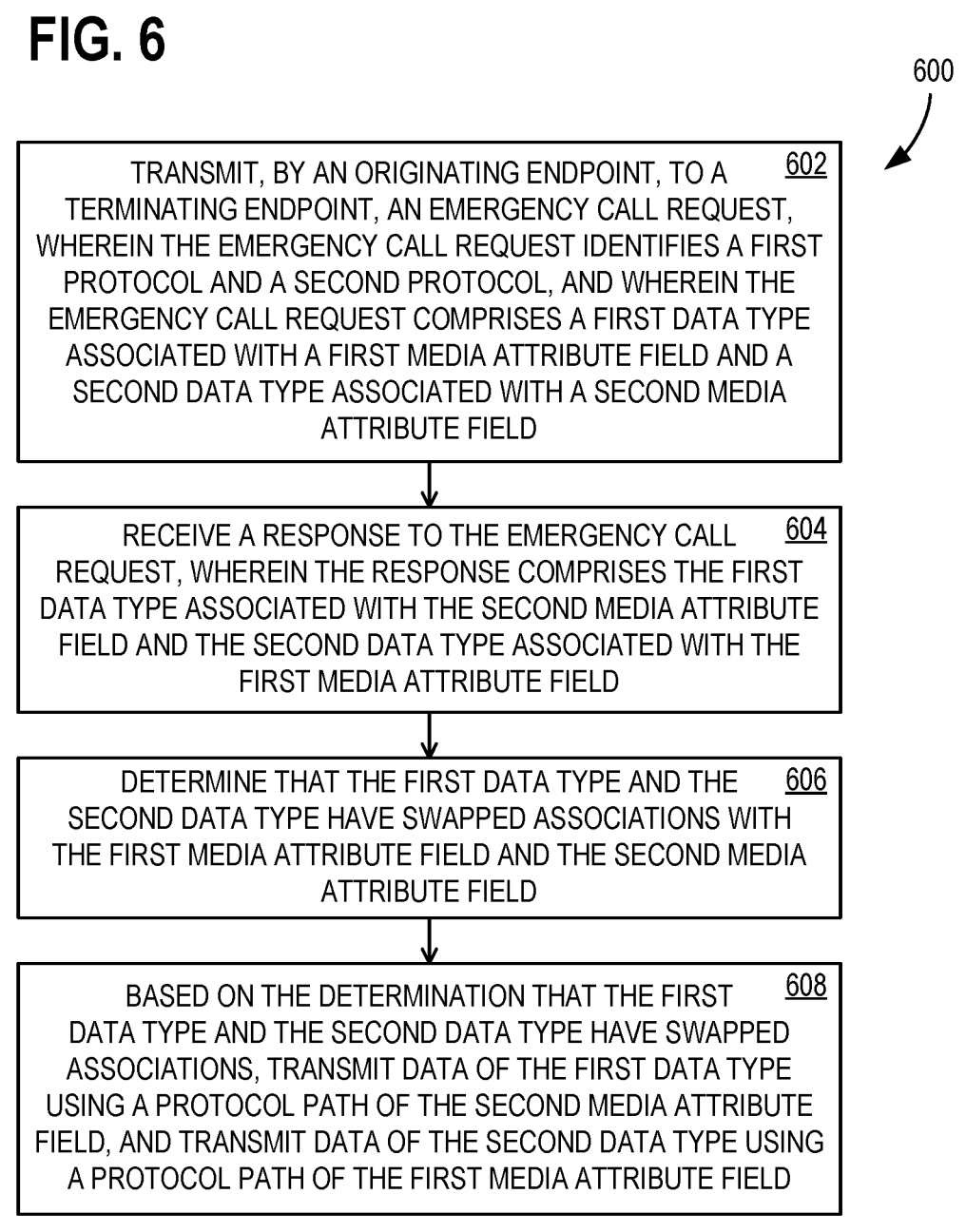

TRANSMIT, BY AN ORIGINATING ENDPOINT, TO A    602
TERMINATING ENDPOINT, AN EMERGENCY CALL REQUEST,
WHEREIN THE EMERGENCY CALL REQUEST IDENTIFIES A FIRST
PROTOCOL AND A SECOND PROTOCOL, AND WHEREIN THE
EMERGENCY CALL REQUEST COMPRISES A FIRST DATA TYPE
ASSOCIATED WITH A FIRST MEDIA ATTRIBUTE FIELD AND A
SECOND DATA TYPE ASSOCIATED WITH A SECOND MEDIA
ATTRIBUTE FIELD

RECEIVE A RESPONSE TO THE EMERGENCY CALL    604
REQUEST, WHEREIN THE RESPONSE COMPRISES THE FIRST
DATA TYPE ASSOCIATED WITH THE SECOND MEDIA ATTRIBUTE
FIELD AND THE SECOND DATA TYPE ASSOCIATED WITH THE
FIRST MEDIA ATTRIBUTE FIELD

DETERMINE THAT THE FIRST DATA TYPE AND THE    606
SECOND DATA TYPE HAVE SWAPPED ASSOCIATIONS WITH
THE FIRST MEDIA ATTRIBUTE FIELD AND THE SECOND MEDIA
ATTRIBUTE FIELD

BASED ON THE DETERMINATION THAT THE FIRST    608
DATA TYPE AND THE SECOND DATA TYPE HAVE SWAPPED
ASSOCIATIONS, TRANSMIT DATA OF THE FIRST DATA TYPE
USING A PROTOCOL PATH OF THE SECOND MEDIA ATTRIBUTE
FIELD, AND TRANSMIT DATA OF THE SECOND DATA TYPE USING
A PROTOCOL PATH OF THE FIRST MEDIA ATTRIBUTE FIELD

Figure 7:
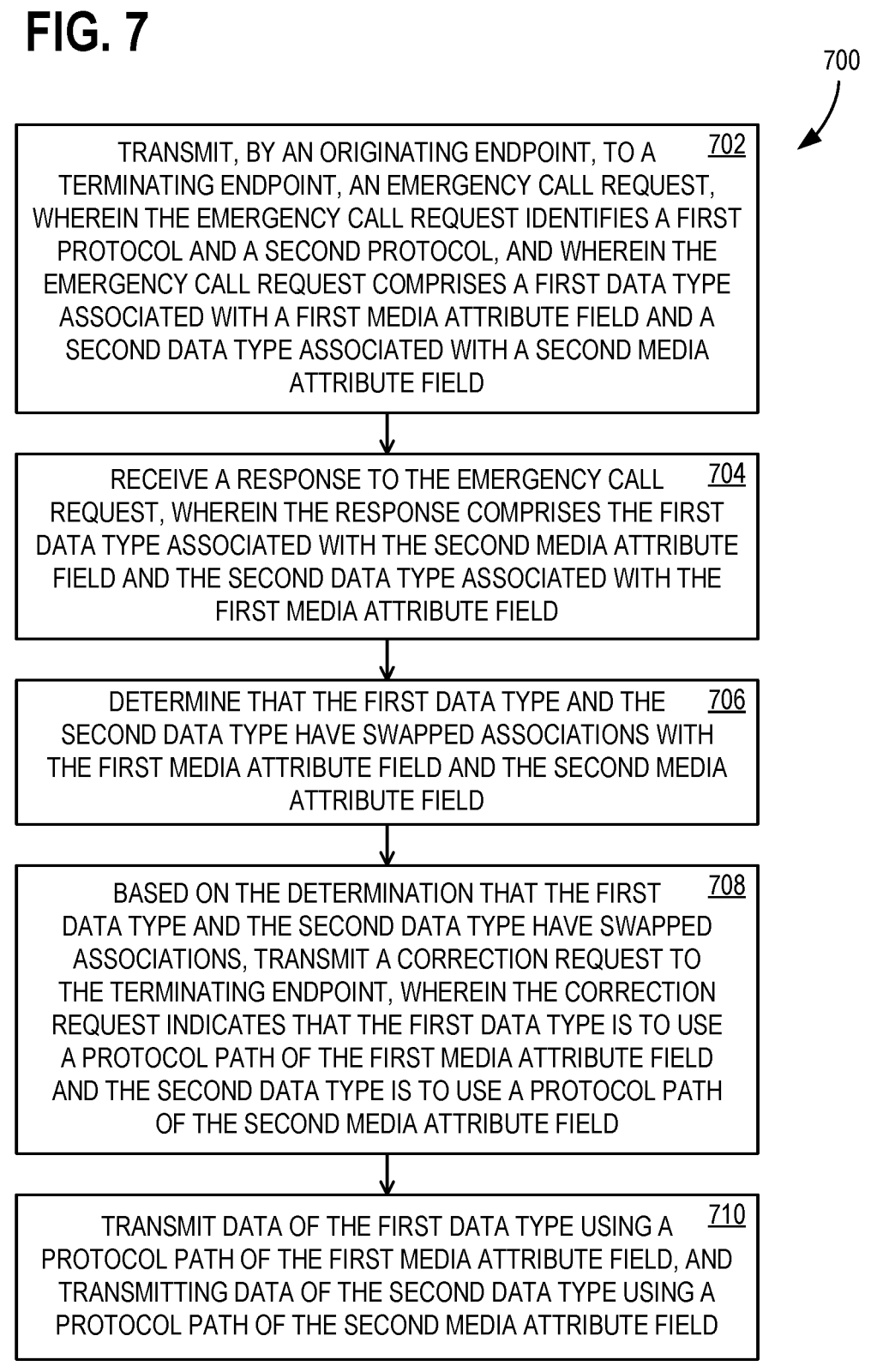

TRANSMIT, BY AN ORIGINATING ENDPOINT, TO A    702
TERMINATING ENDPOINT, AN EMERGENCY CALL REQUEST,
WHEREIN THE EMERGENCY CALL REQUEST IDENTIFIES A FIRST
PROTOCOL AND A SECOND PROTOCOL, AND WHEREIN THE
EMERGENCY CALL REQUEST COMPRISES A FIRST DATA TYPE
ASSOCIATED WITH A FIRST MEDIA ATTRIBUTE FIELD AND A
SECOND DATA TYPE ASSOCIATED WITH A SECOND MEDIA
ATTRIBUTE FIELD

RECEIVE A RESPONSE TO THE EMERGENCY CALL    704
REQUEST, WHEREIN THE RESPONSE COMPRISES THE FIRST
DATA TYPE ASSOCIATED WITH THE SECOND MEDIA ATTRIBUTE
FIELD AND THE SECOND DATA TYPE ASSOCIATED WITH THE
FIRST MEDIA ATTRIBUTE FIELD

DETERMINE THAT THE FIRST DATA TYPE AND THE    706
SECOND DATA TYPE HAVE SWAPPED ASSOCIATIONS WITH
THE FIRST MEDIA ATTRIBUTE FIELD AND THE SECOND MEDIA
ATTRIBUTE FIELD

BASED ON THE DETERMINATION THAT THE FIRST    708
DATA TYPE AND THE SECOND DATA TYPE HAVE SWAPPED
ASSOCIATIONS, TRANSMIT A CORRECTION REQUEST TO
THE TERMINATING ENDPOINT, WHEREIN THE CORRECTION
REQUEST INDICATES THAT THE FIRST DATA TYPE IS TO USE
A PROTOCOL PATH OF THE FIRST MEDIA ATTRIBUTE FIELD
AND THE SECOND DATA TYPE IS TO USE A PROTOCOL PATH
OF THE SECOND MEDIA ATTRIBUTE FIELD

TRANSMIT DATA OF THE FIRST DATA TYPE USING A    710
PROTOCOL PATH OF THE FIRST MEDIA ATTRIBUTE FIELD, AND
TRANSMITTING DATA OF THE SECOND DATA TYPE USING A
PROTOCOL PATH OF THE SECOND MEDIA ATTRIBUTE FIELD

Figure 8:
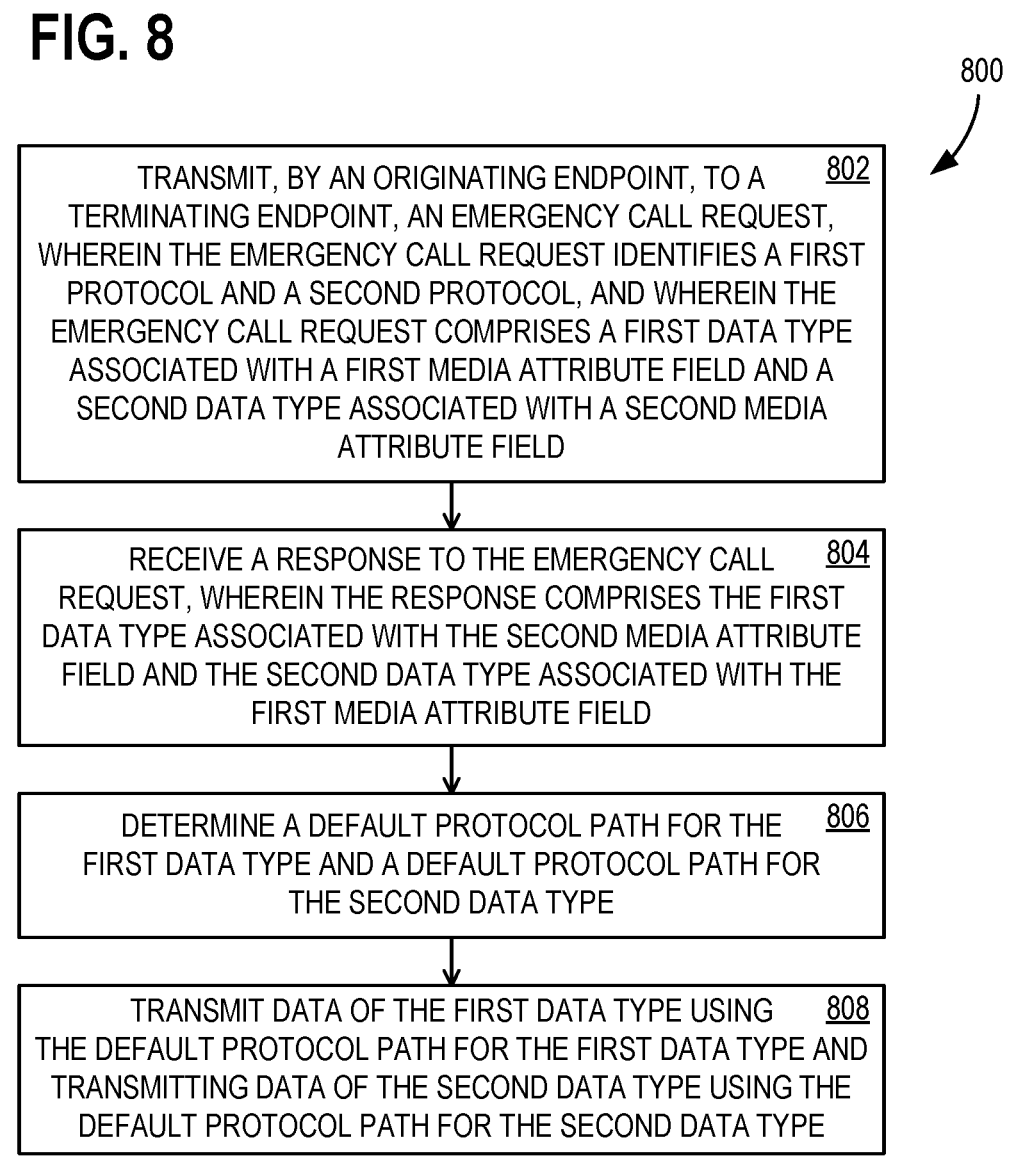

TRANSMIT, BY AN ORIGINATING ENDPOINT, TO A     802
TERMINATING ENDPOINT, AN EMERGENCY CALL REQUEST,
WHEREIN THE EMERGENCY CALL REQUEST IDENTIFIES A FIRST
PROTOCOL AND A SECOND PROTOCOL, AND WHEREIN THE
EMERGENCY CALL REQUEST COMPRISES A FIRST DATA TYPE
ASSOCIATED WITH A FIRST MEDIA ATTRIBUTE FIELD AND A
SECOND DATA TYPE ASSOCIATED WITH A SECOND MEDIA
ATTRIBUTE FIELD

RECEIVE A RESPONSE TO THE EMERGENCY CALL     804
REQUEST, WHEREIN THE RESPONSE COMPRISES THE FIRST
DATA TYPE ASSOCIATED WITH THE SECOND MEDIA ATTRIBUTE
FIELD AND THE SECOND DATA TYPE ASSOCIATED WITH THE
FIRST MEDIA ATTRIBUTE FIELD

DETERMINE A DEFAULT PROTOCOL PATH FOR THE     806
FIRST DATA TYPE AND A DEFAULT PROTOCOL PATH FOR
THE SECOND DATA TYPE

TRANSMIT DATA OF THE FIRST DATA TYPE USING     808
THE DEFAULT PROTOCOL PATH FOR THE FIRST DATA TYPE AND
TRANSMITTING DATA OF THE SECOND DATA TYPE USING THE
DEFAULT PROTOCOL PATH FOR THE SECOND DATA TYPE

EMERGENCY CALL REAL TIME TEXT (RTT) TO RTT EXCHANGE

BACKGROUND

For reasons related to public safety, even when a user equipment (UE) has a subscriber identity module (SIM) that is linked to a post-paid subscriber account that is suspended for any reason (e.g., failure to pay or customer request for suspension), cellular networks nevertheless permit the UE to make emergency calls. Emergency calls placed by UEs over cellular networks, for example enhanced 911 (e911) calls in the United States (US) and enhanced 112 (e112) calls in the European Union (EU), are typically answered and handled by a public safety answering point (PSAP).

SUMMARY

The following summary is provided to illustrate examples disclosed herein but is not meant to limit all examples to any particular configuration or sequence of operations.

Disclosed solutions for emergency call real time text (RTT) to RTT exchange include: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field: determining that the first data type and the second data type have swapped associations with the first media attribute field and the second media attribute field; and based on the determination that the first data type and the second data type have swapped associations, transmitting data of the first data type using a protocol path value of the second media attribute field, and transmitting data of the second data type using a protocol path value of the first media attribute field.

Additional disclosed solutions include: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field; determining that the first data type and the second data type have swapped associations with the first media attribute field and the second media attribute field; based on the determination that the first data type and the second data type have swapped associations, transmitting a correction request to the terminating endpoint, wherein the correction request indicates that the first data type is to use a protocol path value of the first media attribute field the second data type is to uses a protocol path value of the second media attribute field; and transmitting data of the first data type using a protocol path value of the first media attribute field, and transmitting data of the second data type using a protocol path value of the second media attribute field.

Additional disclosed solutions include: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field; determining a default protocol path value for the first data type and a default protocol path value for the second data type; and transmitting data of the first data type using the default protocol path value for the first data type and transmitting data of the second data type using the default protocol path value for the second data type.

BRIEF DESCRIPTION OF THE DRAWINGS

The disclosed examples are described below with reference to the accompanying drawing figures listed below, wherein:

FIG. 2 illustrates further detail for signaling that may be used in the architecture of FIG. 1;

FIGS. 6, 7, and 8 illustrate additional flowcharts of exemplary operations associated with the architecture of FIG. 1.

Figure 1:
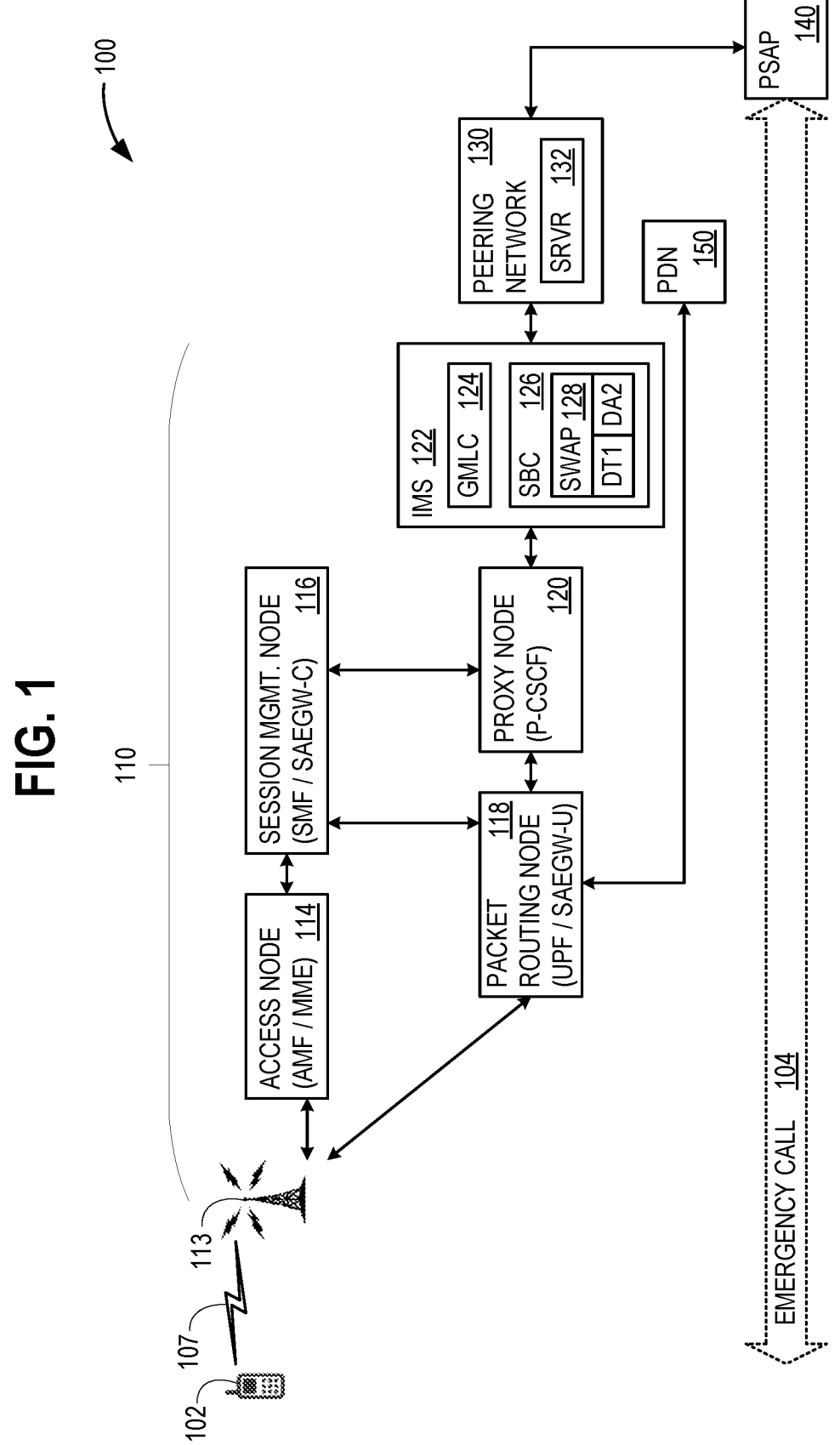
FIG. 1 illustrates an exemplary architecture that advantageously provides emergency call real time text (RTT) to RTT exchange.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Emergency calls that use real time text (RTT) in addition to audio face a challenge: between an originating endpoint (e.g., a cellular network) sending a session initiation protocol (SIP) invite and receiving the response (e.g., 200 OK) from a downstream terminating endpoint (e.g., a peering network), the media attribute fields associated with the text and audio data may become swapped. Three options are disclosed for dealing with this issue. (1) The originating endpoint may swap the protocol path values for the RTT and audio data so that the public safety answering point (PSAP) and the user equipment (UE) are able to communicate. (2) The originating endpoint may send a correction request to the terminating endpoint. (3) If default protocol path values are specified for RTT and audio, the originating endpoint uses the default protocol path values independently of whether the SIP invite or response specified the correct data type and protocol path value associations.

Aspects of the disclosure enhance public safety by ensuring that an emergency call from a cellular network (e.g., from a UE) to a PSAP, which uses RTT, will not fail due to an inadvertent swap of the protocol path values for text and audio data. This may be accomplished by one of multiple solutions: (1) based on a determination that a first data type (e.g., text, such as RTT) and a second data type (e.g., audio) have swapped associations, transmitting data of the first data type using a protocol path value of the second media attribute field, and transmitting data of the second data type using a protocol path value of the first media attribute field; (2) based on the determination that the first data type and the second data type have swapped associations, transmitting a correction request to a terminating endpoint, wherein the correction request indicates that the first data type is to use the protocol path value of the first media attribute field and the second data type is to use the protocol path value of the second media attribute field; or (3) transmitting data of the first data type using a default protocol path value for the first data type and transmitting data of the second data type using the default protocol path value for the second data type.

With reference now to the figures, FIG. 1 illustrates an architecture 100 that advantageously provides an emergency call 104 with both audio and RTT between a UE 102 and a PSAP node 140. In architecture 100, a wireless network 110 carries emergency call 104 from UE 102 to a peering network 130 that then carries emergency call 104 to PSAP node 140. Wireless network 110 is depicted as a cellular network, and emergency call 104 may be an enhanced 911 (E911) or E112 call.

Emergency calls placed by UEs over cellular networks, for example E911 calls in the United States (US) and E112 calls in the European Union (EU), are typically answered and handled by a PSAP. Cellular networks typically operate in compliance with Third Generation Partnership Project (3GPP) technical standards (TSs), in addition to other TSs and governing laws and regulations.

UE 102 reaches wireless network 110 via an air interface 107 with a radio access network (RAN) 113. Wireless network 110 also has an access node 114, a session management node 116, a packet routing node 118, a proxy node 120, and an internet protocol (IP) multimedia subsystem (IMS) 122. IMS 122 has a gateway mobile location center (GMLC) 124 and a session border controller (SBC) 126. GMLC 124 is used to identify a location of UE 102 in order to select the proper PSAP to handle emergency call 104 (e.g., often the closest PSAP to the UE placing the call).

In fifth generation (5G) cellular examples of wireless network 110, RAN 113 may comprise a gNode B (gNB), access node 114 may comprise an access mobility function (AMF), session management node 116 may comprise a session management function (SMF), and packet routing node 118 may comprise a user plane function (UPF). In fourth generation (4G) cellular examples, RAN 113 may comprise an eNodeB (eNB), access node 114 may comprise a mobility management entity (MME), session management node 116 may comprise a system architecture evolution gateway (SAEGW) control plane (SAEGW-C), and packet routing node 118 may comprise an SAEGW-user plane (SAEGW-U). An SAEGW is a combination of a serving gateway (SGW) and a packet data network gateway (PGW). In some examples, proxy node 120 comprises a proxy call session control function (P-CSCF). Wireless network 110 also reaches a packet data network (PDN) 150 (e.g., the internet) via packet routing node 118.

Access node 114 and session management node 116 carry signaling, such as for call setup, and are within a control plane of wireless network 110. Packet routing node 118 and proxy node 120 carry data packets, such as voice and text data packets, and are within a user plane of wireless network 110.

SBC 126 is a network element deployed to protect session initiation protocol (SIP) based voice over internet protocol (VOIP) networks between two service provider networks in a peering environment. A session, as used herein, refers to a communication between two or more parties which, in the context of telephony, includes callas such as emergency call 104. Each call includes one or more call signaling message exchanges that control the call, and one or more call media streams that carry the call's audio, video, text and/or other data along with possibly other information. Together, these streams make up a session.

SBC 126 has swap logic 128 that is able to swap protocol path values for text and audio data, if necessary, or request that a downstream node, such as a server 132 (a node) within peering network 130, swap its allocation of protocol path values for text and audio data. In some examples, swap logic 128 uses header manipulation rules (HMR). Additionally, SBC 126 has DT1, which is the default protocol path value for text data (e.g., RTT) in an emergency call, and DA2, which is the default protocol path value for audio data (e.g., an audio codec packets) in an emergency call. In some examples, DT1 and DA2 are specified in a 3GPP TS or other specification related to cellular networks.

FIG. 2 illustrates an emergency call request 204, which may be a SIP invite, and lists some of the relevant content. As is shown later, in FIGS. 3 and 4, emergency call request 204 is transmitted from wireless network 110 to peering network 130, which then forwards emergency call request 204 to PSAP node 140, in order to initiate emergency call 104.

As illustrated in FIG. 2, emergency call request 204 indicates a real time protocol (RTP) and an audio video protocol (AVP). RTT is an RTP, and differs from short message service (SMS) text in that as a user of UE 102 presses a key to select a letter, that letter is transmitted to PSAP node 140 without requiring the user to press a send key or icon (as does SMS). This real time letter transmission will be two-way in emergency call 104. AVP carries audio data with an audio codec.

Emergency call request 204 identifies a first protocol 201 as "t140", which is an RTT codec, and a second protocol 202 as "red" for audio. Two media types, identified as a multi-purpose internet mail extension (MIME) types, indicate data types. A first data type 211 is associated with a first media attribute field 231 and a second data type 212 is associated with a second media attribute field 232. A protocol path 221 of media attribute field 231 has the value 112 and a protocol path 222 of media attribute field 232 has the value 111.

In emergency call request 204, RTP (further specified as RTT via codec t140) is assigned to a protocol path value 112 (the value of protocol path 221), and audio (AVP) is assigned to a protocol path value 111 (the value of protocol path 222).

Figure 3:
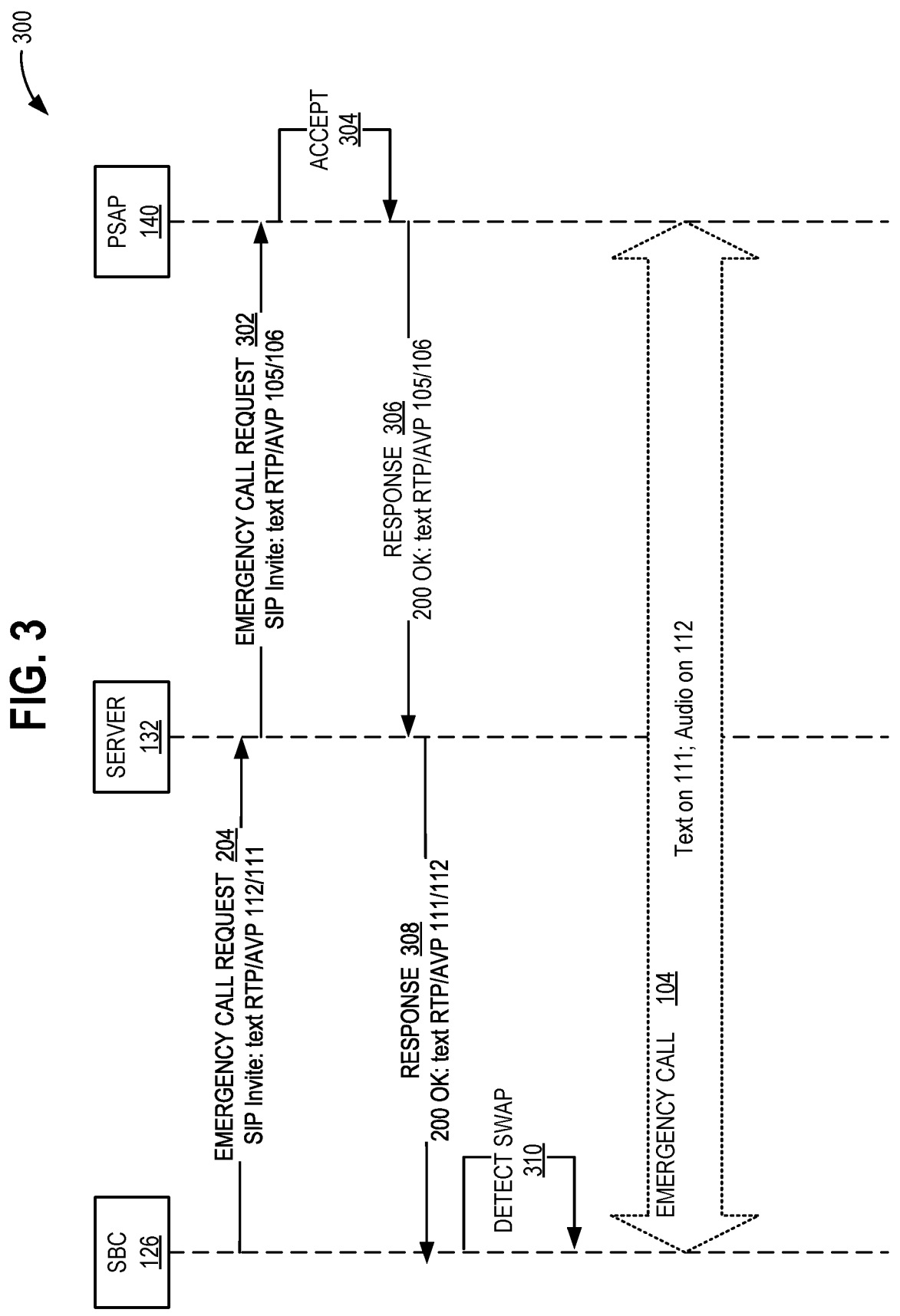
FIG. 3 illustrates a message sequence diagram for messages that may be used in the architecture of FIG. 1.

FIG. 3 illustrates a message sequence diagram 300 for setting up emergency call 104. When SBC 126 transmits messages emergency call request 204 to server 132 in peering network 130, SBC 126 is acting as an originating endpoint and server 132 is a terminating endpoint. Server 132 modifies emergency call request 204 into an emergency call request 302, which is also a SIP invite, but instead changes the protocol path values for RTP and AVP. In emergency call request 302, RTP is assigned a protocol path value of 105 and AVP is assigned a protocol path value of 106.

When server 132 transmits messages emergency call request 302 to PSAP node 140, server 132 is acting as an originating endpoint and PSAP node 140 is a terminating endpoint. The roles originating endpoint and terminating endpoint are relative, and in the scenario indicated in FIG. 3, server 132 takes on both roles. PSAP node 140 accepts emergency call request 302, shown as an accept decision 304, and returns a SIP "200 OK" message as a response 306.

In response 306, RTP is assigned a protocol path value 105 and AVP is assigned a protocol path value 106. This is the same as emergency call request 302. When server 132 receives response 306, server changes back to the protocol path values 112 and 111 used in emergency call request 204, and sends SIP 200 OK message to SBC 126 as response 308.

However, in response 306, RTP is assigned to protocol path value 111 and AVP is assigned to protocol path value 112. This is swapped, relative to emergency call request 204. In this scenario, the swap occurred within peering network 130, possibly at server 132, although in some scenarios, the swap may occur at PSAP node 140 (e.g., PSAP node may swap protocol path values 105 and 106).

SBC 126 detects the swap in detection process 310, by determining that data type 211 (originally text as indicated by protocol 201 being set to t140) and data type 212 (originally audio as indicated by protocol 202 being set to red) have swapped associations with media attribute field 231 media attribute field 232. That is, protocol path value 112, which had been in media attribute field 231 and associated with data in emergency call request 204 is now in media attribute field 232 and associated with audio in response 308; and similarly, protocol path value 111, which had been in media attribute field 232 and associated with audio in emergency call request 204 is now in media attribute field 231 and associated with text in response 308.

As shown in FIG. 3, when emergency call 104 is set up, SBC 126 uses the protocol path values from response 308, rather than attempting to diagnose or correct the swap. This means that, in emergency call 104, SBC 126 transmits RTT (or other text) to server 132 using protocol path value 111 and transmits audio to server 132 using protocol path value 112. The swapping may be performed by swap logic 128, using HMR, in some examples.

Alternatively, if it had been PSAP node 140 that had swapped the protocol path values (i.e., reversed protocol path values 105 and 106), server 132 could perform detection process 310 and swap text and audio in protocol path values 105 and 106 to match response 306.

As another alternative, SBC 126 and/or server 132 could just assign text to protocol path value DT1 (default text) and assign audio to protocol path value DA2 (default audio), if there is some governing standard that specifies a default protocol path value for audio and a default protocol path value for text when RTT and audio are used simultaneously in an emergency call. This option may preclude the need for detection process 310.

Figure 4:
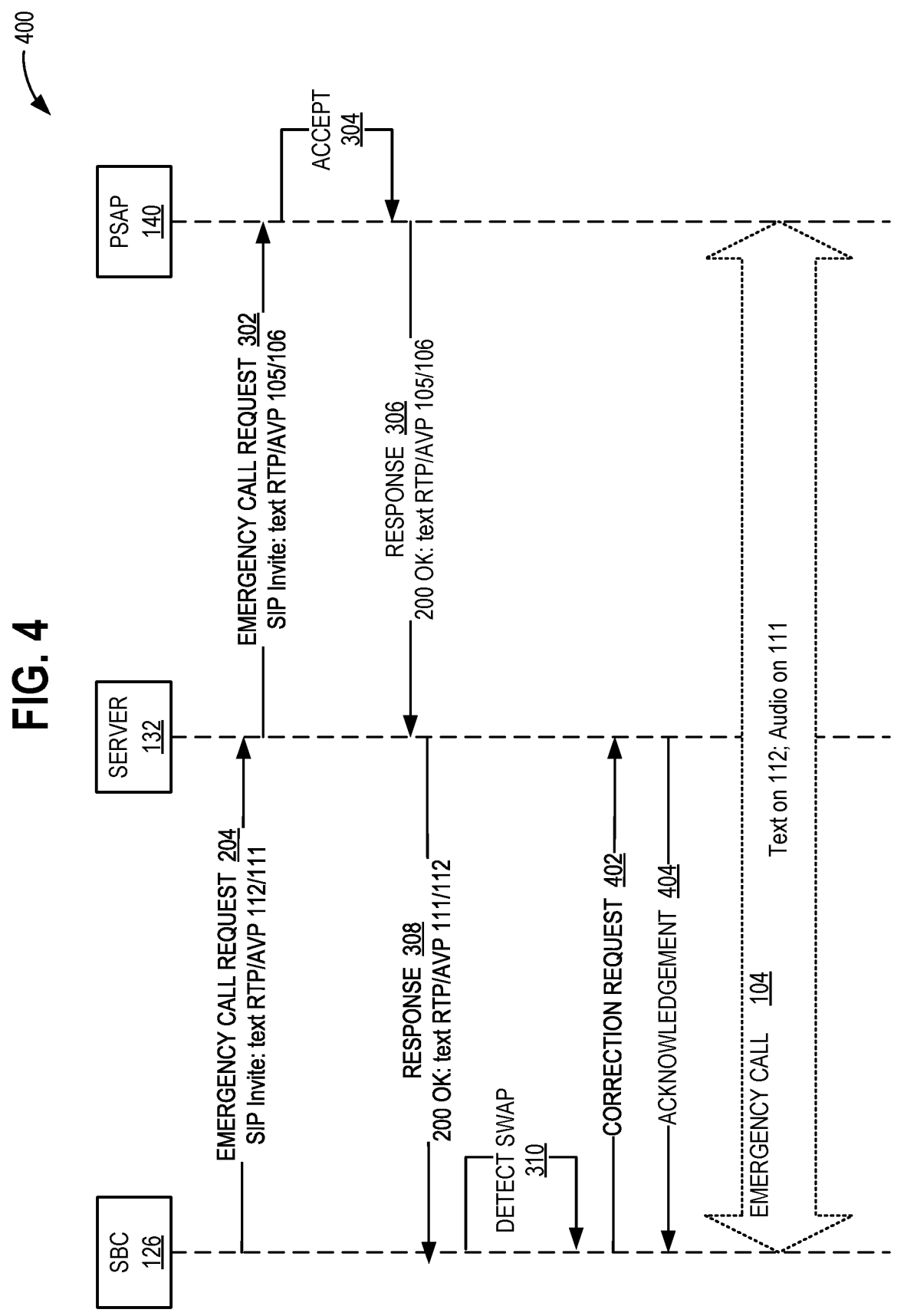
FIG. 4 illustrates another message sequence diagram for messages that may be used in the architecture of FIG. 1.

FIG. 4 illustrates a message sequence diagram 400 for another alternative. Message sequence diagram 400 is the same as message sequence diagram 300 up through detection process 310. However, rather than SBC 126 swapping the protocol path values, SBC 126 instead transmits a correction request 402 to server 132. Correction request 402 instructs server 132 to correct the protocol path values back to those of emergency call request 204.

Server 132 returns an acknowledgement 404 of having performed a correction and, in emergency call 104, SBC 126 transmits RTT (or other text) to server 132 using protocol path value 112 and transmits audio to server 132 using protocol path value 111—as had been indicated in emergency call request 204.

Figure 5:
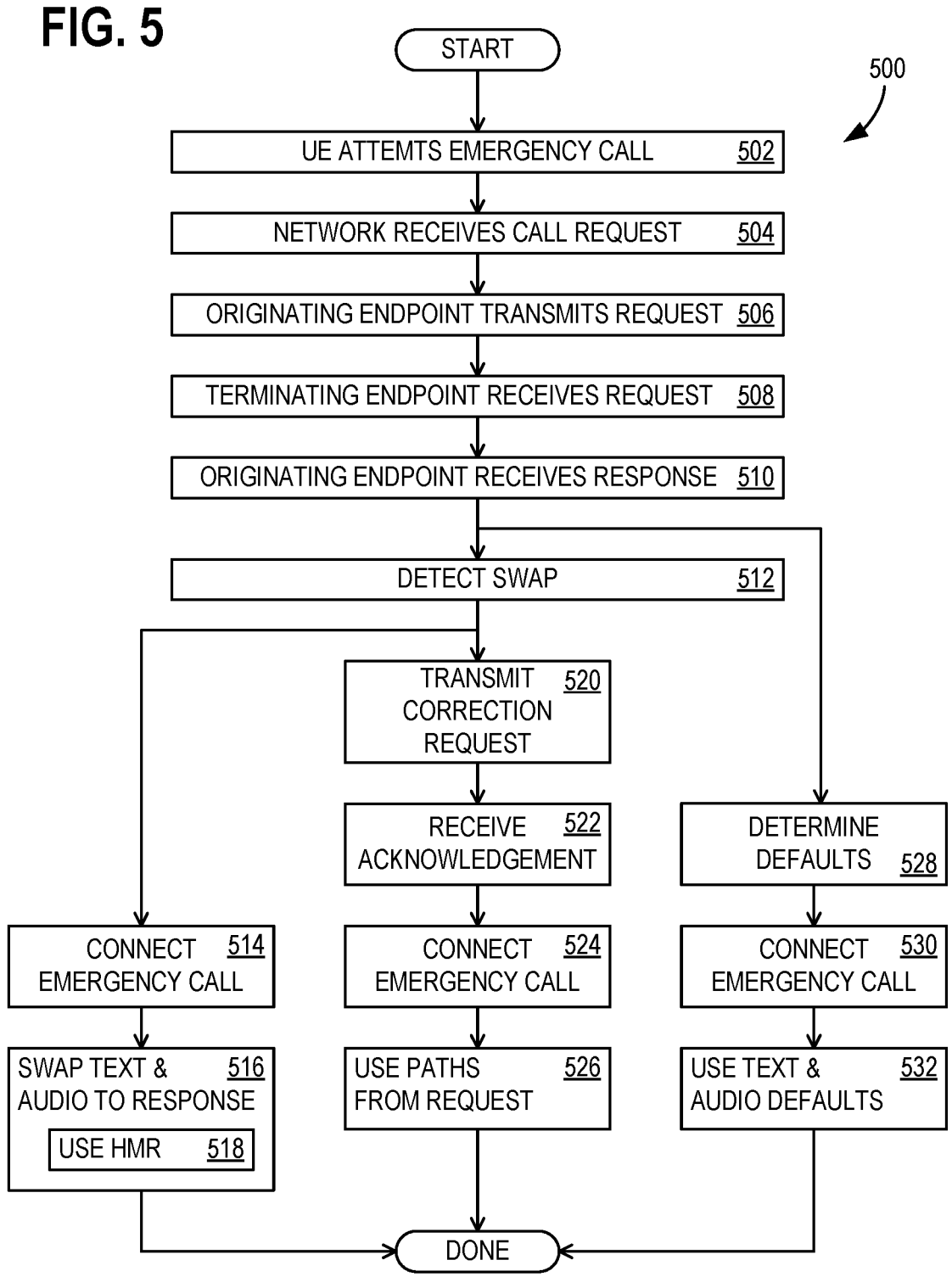
FIG. 5 illustrates a flowchart of exemplary operations associated with the architecture of FIG. 1.

FIG. 5 illustrates a flowchart 500 of exemplary operations associated with UE 102 placing emergency call 104. In some examples, at least a portion of flowchart 500 may be performed using one or more computing devices 900 of FIG. 9. Flowchart 500 commences with UE 102 attempting to place emergency call 104 using RTT (or adding RTT to an existing emergency call) by transmitting an emergency call request, in operation 502. In operation 504, SBC 126 receives the emergency call request from UE 102.

The remainder of the description of flowchart refers to an originating endpoint and a terminating endpoint. In should be understood that the operations of flowchart 500 that refer to an originating endpoint may be refereeing to either SBC 126 or server 132, and the operations of flowchart 500 that refer to a terminating endpoint may be refereeing to either server 132 or PSAP node 140. SBC 126 is an originating endpoint relative to server 132 and server 132 is a terminating endpoint relative to SBC 126. Similarly, server 132 is a is an originating endpoint relative to PSAP node 140 and PSAP node 140 is a terminating endpoint relative to server 132. Additionally, SBC 126 is an originating endpoint relative to PSAP node 140 and PSAP node 140 is a terminating endpoint relative to SBC 126 when server 132 is not present (i.e., there is no peering network 130 and wireless network 110 connects to PSAP node 140 without an intermediate network).

In operation 506 the originating endpoint transmits emergency call request 204 (or 302) to the terminating endpoint. Emergency call request 204 identifies protocol 201 as "t140", which is an RTP, and identifies protocol 202 as "red", which is an AVP. Emergency call request 204 comprises data type 211, which is a text data type such as RTT, associated with media attribute field 231, and data type 212, which is an audio data type, associated with media attribute field 232.

The terminating endpoint receives emergency call request 204 in operation 508, and the originating endpoint receives response 308 to emergency call request 204 in operation 510. Response 308 comprises data type 211 associated with media attribute field 232 and data type 212 associated with media attribute field 231. This is a swap of the protocol path values.

Some examples of flowchart operation divert to operation 530, which is described below. However, other examples of flowchart 500 proceed to operation 512 in which the originating endpoint determining that data type 211 and data type 212 have swapped associations with media attribute field 231 and media attribute field 232 (i.e., that protocol path values 111 and 112 have been swapped).

Some examples of flowchart operation divert to operation 520, which is described below. However, other examples of flowchart 500 proceed to operation 514 and do not use operations 520-532.

In operation 514, emergency call 104 is connected. In operation 516, the originating endpoint transmits data of data type 211 using the protocol path value of media attribute field 232, and transmits data of data type 212 using the protocol path value of media attribute field 231. That is, RTT is transmitted using protocol path value 111 and audio is transmitted using protocol path value 112. These are the protocol path values associated with text and audio, respectively, in response 308 and are swapped relative to emergency call request 204. In some examples, operation 518 uses HMR to swap data type 211 to the protocol path value of media attribute field 232 and to swap data type 212 to the protocol path value of media attribute field 231.

In an alternative operation, flowchart 500 uses operations 520-526 instead of operations 514 and operations 528-532. In operation 520, the originating endpoint transmits correction request 402 to the terminating endpoint. Correction request 402 indicates that data type 211 is to use the protocol path value of media attribute field 231 and data type 212 is to use the protocol path value of media attribute field 232. The originating endpoint receives acknowledgement 404 of the terminating endpoint having performed a correction in operation 522.

In operation 524, emergency call 104 is connected. In operation 526, the originating endpoint transmits data of data type 211 using the protocol path value of media attribute field 231, and transmits data of data type 212 using the protocol path value of media attribute field 232. That is, RTT is transmitted using protocol path value 112 and audio is transmitted using protocol path value 111. These are the protocol path values associated with text and audio, respectively, in emergency call request 204 and are swapped relative to response 308.

In an alternative operation, flowchart 500 uses operations 528-532 instead of operations 512-526. Operation 528 determines the default protocol path value for data type 211 and the default protocol path value for data type 212, and operation 530 connects emergency call 104. In operation 532, the originating endpoint transmits data of data type 211 using the default protocol path value for data type 211, and transmits data of data type 212 using the protocol path value of media attribute field 232. That is, RTT is transmitted using protocol path value DT1 and audio is transmitted using protocol path value DA2.

FIG. 6 illustrates a flowchart 600 of exemplary operations associated with examples of architecture 100. In some examples, at least a portion of flowchart 600 may be performed using one or more computing devices 900 of FIG. 9. Flowchart 600 commences with operation 602, which includes transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field.

Operation 604 includes receiving a response to the emergency call request, wherein the response comprises the first data type associated with the second media attribute field and the second data type associated with the first media attribute field. Operation 606 includes determining that the first data type and the second data type have swapped associations with the first media attribute field and the second media attribute field. Operation 608 includes, based on the determination that the first data type and the second data type have swapped associations, transmitting data of the first data type using a protocol path value of the second media attribute field, and transmitting data of the second data type using a protocol path value of the first media attribute field.

FIG. 7 illustrates a flowchart 700 of exemplary operations associated with examples of architecture 100. In some examples, at least a portion of flowchart 700 may be performed using one or more computing devices 900 of FIG. 9. Flowchart 700 commences with operation 702, which includes transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field.

Operation 704 includes receiving a response to the emergency call request, wherein the response comprises the first data type associated with the second media attribute field and the second data type associated with the first media attribute field. Operation 706 includes determining that the first data type and the second data type have swapped associations with the first media attribute field and the second media attribute field. Operation 708 includes, based on the determination that the first data type and the second data type have swapped associations, transmitting a correction request to the terminating endpoint, wherein the correction request indicates that the first data type is to use a protocol path value of the first media attribute field and the second data type is to use a protocol path value of the second media attribute field. Operation 710 includes transmitting data of the first data type using a protocol path value of the first media attribute field, and transmitting data of the second data type using a protocol path value of the second media attribute field.

FIG. 8 illustrates a flowchart 800 of exemplary operations associated with examples of architecture 100. In some examples, at least a portion of flowchart 800 may be performed using one or more computing devices 900 of FIG. 9. Flowchart 800 commences with operation 802, which includes transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field.

Operation 804 includes receiving a response to the emergency call request, wherein the response comprises the first data type associated with the second media attribute field and the second data type associated with the first media attribute field. Operation 806 includes determining a default protocol path value for the first data type and a default protocol path value for the second data type. Operation 808 includes transmitting data of the first data type using the default protocol path value for the first data type and transmitting data of the second data type using the default protocol path value for the second data type.

Figure 9:
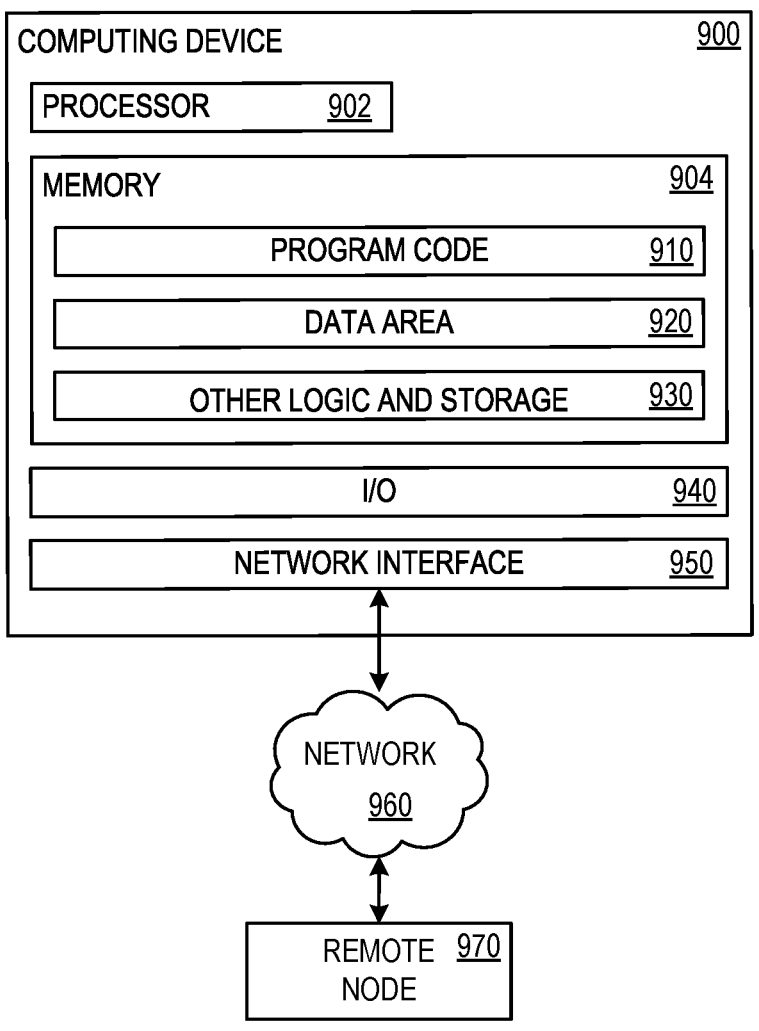
FIG. 9 illustrates a block diagram of a computing device suitable for implementing various aspects of the disclosure.

FIG. 9 illustrates a block diagram of computing device 900 that may be used as any component described herein that may require computational or storage capacity. Computing device 900 has at least a processor 902 and a memory 904 that holds program code 910, data area 920, and other logic and storage 930. Memory 904 is any device allowing information, such as computer executable instructions and/ or other data, to be stored and retrieved. For example, memory 904 may include one or more random access memory (RAM) modules, flash memory modules, hard disks, solid-state disks, persistent memory devices, and/or optical disks. Program code 910 comprises computer executable instructions and computer executable components including instructions used to perform operations described herein. Data area 920 holds data used to perform operations described herein. Memory 904 also includes other logic and storage 930 that performs or facilitates other functions disclosed herein or otherwise required of computing device 900. An input/output (I/O) component 940 facilitates receiving input from users and other devices and generating displays for users and outputs for other devices.

A network interface 950 permits communication over a network 960 with a remote node 970, which may represent another implementation of computing device 900. For example, a remote node 970 may represent another of the above-noted nodes within architecture 100.

Additional Examples

An example method comprises: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field; determining that the first data type and the second data type have swapped associations with the first media attribute field and the second media attribute field; and based on the determination that the first data type and the second data type have swapped associations, transmitting data of the first data type using a protocol path value of the second media attribute field, and transmitting data of the second data type using a protocol path value of the first media attribute field.

An example system comprises: a processor; and a computer-readable medium storing instructions that are operative upon execution by the processor to: transmit, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receive a response to the emergency call request, wherein the response comprises the first data type associated with the second media attribute field and the second data type associated with the first media attribute field; determine that the first data type and the second data type have swapped associations with the first media attribute field and the second media attribute field; and based on the determination that the first data type and the second data type have swapped associations, transmit data of the first data type using a protocol path value of the second media attribute field, and transmit data of the second data type using a protocol path value of the first media attribute field.

One or more example computer storage devices has computer-executable instructions stored thereon, which, upon execution by a computer, cause the computer to perform operations comprising: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field; receiving a response to the emergency call request, wherein the response comprises the first data type associated with the second media attribute field and the second data type associated with the first media attribute field; determining that the first data type and the second data type have swapped associations with the first media attribute field and the second media attribute field; and based on the determination that the first data type and the second data type have swapped associations, transmitting data of the first data type using a protocol path value of the second media attribute field, and transmitting data of the second data type using a protocol path value of the first media attribute field.

Another example method comprises: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field; determining that the first data type and the second data type have swapped associations with the first media attribute field and the second media attribute field; based on the determination that the first data type and the second data type have swapped associations, transmitting a correction request to the terminating endpoint, wherein the correction request indicates that the first data type is to use a protocol path value of the first media attribute field and the second data type is to use a protocol path value of the second media attribute field; and transmitting data of the first data type using a protocol path value of the first media attribute field, and transmitting data of the second data type using a protocol path value of the second media attribute field.

Another example system comprises: a processor; and a computer-readable medium storing instructions that are operative upon execution by the processor to: transmit, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field; receive a response to the emergency call request, wherein the response comprises the first data type associated with the second media attribute field and the second data type associated with the first media attribute field; determine that the first data type and the second data type have swapped associations with the first media attribute field and the second media attribute field; based on the determination that the first data type and the second data type have swapped associations, transmit a correction request to the terminating endpoint, wherein the correction request indicates that the first data type is to use a protocol path value of the first media attribute field and the second data type is to use a protocol path value of the second media attribute field; and transmit data of the first data type using a protocol path value of the first media attribute field, and transmit data of the second data type using a protocol path value of the second media attribute field.

One or more additional example computer storage devices has computer-executable instructions stored thereon, which, upon execution by a computer, cause the computer to perform operations comprising: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field; determining that the first data type and the second data type have swapped associations with the first media attribute field and the second media attribute field; based on the determination that the first data type and the second data type have swapped associations, transmitting a correction request to the terminating endpoint, wherein the correction request indicates that the first data type is to use a protocol path value of the first media attribute field and the second data type is to use a protocol path value of the second media attribute field; and transmitting data of the first data type using a protocol path value of the first media attribute field, and transmitting data of the second data type using a protocol path value of the second media attribute field.

Another example method comprises: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field; determining a default protocol path value for the first data type and a default protocol path value for the second data type: and transmitting data of the first data type using the default protocol path value for the first data type and transmitting data of the second data type using the default protocol path value for the second data type.

Another example system comprises: a processor: and a computer-readable medium storing instructions that are operative upon execution by the processor to: transmit, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field; receive a response to the emergency call request, wherein the response comprises the first data type associated with the second media attribute field and the second data type associated with the first media attribute field; determine a default protocol path value for the first data type and a default protocol path value for the second data type; and transmit data of the first data type using the default protocol path value for the first data type and transmit data of the second data type using the default protocol path value for the second data type.

One or more additional example computer storage devices has computer-executable instructions stored thereon, which, upon execution by a computer, cause the computer to perform operations comprising: transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field: receiving a response to the emergency call request, wherein the response comprises the first data type associated with the second media attribute field and the second data type associated with the first media attribute field: determining a default protocol path value for the first data type and a default protocol path value for the second data type; and transmitting data of the first data type using the default protocol path value for the first data type and transmitting data of the second data type using the default protocol path value for the second data type.

Alternatively, or in addition to the other examples described herein, examples include any combination of the following:

the first data type comprises a text data type;

the first data type comprises RTT;

the second data type comprises an audio data type;

the first protocol comprises an RTP;

the second protocol comprises an AVP;

the emergency call request comprises a SIP invite;

the response comprises a SIP 200 OK;

the terminating endpoint comprises a PSAP node;

the terminating endpoint comprises a node within a peering network between the originating endpoint and a PSAP node;

using HMR to swap the first data type to the protocol path value of the second media attribute field and to swap the second data type to the protocol path value of the first media attribute field;

using HMR to ensure the first data type uses the default protocol path value for the first data type the second data type uses the default protocol path value for the first data type;

receiving, by the originating endpoint, from a peering network, the emergency call request;

the originating endpoint comprises an SBC;

receiving, by the originating endpoint, from a user equipment, the emergency call request;

receiving, by the originating endpoint, from a peering network, the emergency call request;

the emergency call comprises an E911 call;

the emergency call comprises an E112 call;

connecting the emergency call;

receiving an acknowledgement of a correction having been performed.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field;

receiving a response to the emergency call request, wherein the response comprises the first data type associated with the second media attribute field and the second data type associated with the first media attribute field, wherein determining that the first data type and the second data type have swapped associations comprises determining that a first protocol path value associated with the first data type in the emergency call request is present in the second media attribute field in the response, and that a second protocol path value associated with the second data type in the emergency call request is present in the first media attribute field in the response;

determining that the first data type and the second data type have swapped associations with the first media attribute field and the second media attribute field; and based on the determination that the first data type and the second data type have swapped associations, transmitting data of the first data type using the second protocol path value of the second media attribute field, and transmitting data of the second data type using the first protocol path value of the first media attribute field.

2. The method of claim 1, wherein the first data type comprises a text data type and the second data type comprises an audio data type.

3. The method of claim 1, wherein the first data type comprises real time text (RTT).

4. The method of claim 1, wherein the first protocol comprises a real time protocol (RTP) and the second protocol comprises an audio video protocol (AVP).

5. The method of claim 1, wherein the emergency call request comprises a session initiation protocol (SIP) invite and the response comprises a SIP 200 OK.

6. The method of claim 1, wherein the terminating endpoint comprises a public safety answering point (PSAP) node; or the terminating endpoint comprises a node within a peering network between the originating endpoint and a PSAP node.

7. The method of claim 1, further comprising:

using header manipulation rules (HMR) to swap the first data type to the second protocol path value of the second media attribute field and to swap the second data type to the first protocol path value of the first media attribute field.

8. A system comprising:

a processor; and a computer-readable medium storing instructions that are operative upon execution by the processor to:

transmit, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field;

receive a response to the emergency call request, wherein the response comprises the first data type associated with the second media attribute field and the second data type associated with the first media attribute field;

determine that the first data type and the second data type have swapped associations with the first media attribute field and the second media attribute field, wherein determining that the first data type and the second data type have swapped associations comprises determining that a first protocol path value associated with the first data type in the emergency call request is present in the second media attribute field in the response, and that a second protocol path value associated with the second data type in the emergency call request is present in the first media attribute field in the response; and based on the determination that the first data type and the second data type have swapped associations, transmit data of the first data type using the second protocol path value of the second media attribute field, and transmit data of the second data type using the first protocol path value of the first media attribute field.

9. The system of claim 8, wherein the first data type comprises a text data type and the second data type comprises an audio data type.

10. The system of claim 8, wherein the first data type comprises real time text (RTT).

11. The system of claim 8, wherein the first protocol comprises a real time protocol (RTP) and the second protocol comprises an audio video protocol (AVP).

12. The system of claim 8, wherein the emergency call request comprises a session initiation protocol (SIP) invite and the response comprises a SIP 200 OK.

13. The system of claim 8, wherein the terminating endpoint comprises a public safety answering point (PSAP) node; or the terminating endpoint comprises a node within a peering network between the originating endpoint and a PSAP node.

14. The system of claim 8, wherein the instructions are further operative to:

use header manipulation rules (HMR) to swap the first data type to the second protocol path value of the second media attribute field and to swap the second data type to the first protocol path value of the first media attribute field.

15. One or more computer storage devices having computer-executable instructions stored thereon, which, upon execution by a computer, cause the computer to perform operations comprising:

transmitting, by an originating endpoint, to a terminating endpoint, an emergency call request, wherein the emergency call request identifies a first protocol and a second protocol, and wherein the emergency call request comprises a first data type associated with a first media attribute field and a second data type associated with a second media attribute field;

receiving a response to the emergency call request, wherein the response comprises the first data type associated with the second media attribute field and the second data type associated with the first media attribute field;

determining that the first data type and the second data type have swapped associations with the first media attribute field and the second media attribute field, wherein determining that the first data type and the second data type have swapped associations comprises determining that a first protocol path value associated with the first data type in the emergency call request is present in the second media attribute field in the response, and that a second protocol path value associated with the second data type in the emergency call request is present in the first media attribute field in the response; and based on the determination that the first data type and the second data type have swapped associations, transmitting data of the first data type using the second protocol path value of the second media attribute field, and transmitting data of the second data type using the first protocol path value of the first media attribute field.

16. The one or more computer storage devices of claim 15, wherein the first data type comprises a text data type and the second data type comprises an audio data type.

17. The one or more computer storage devices of claim 15, wherein the first data type comprises real time text (RTT).

18. The one or more computer storage devices of claim 15, wherein the first protocol comprises a real time protocol (RTP) and the second protocol comprises an audio video protocol (AVP).

19. The one or more computer storage devices of claim 15, wherein the emergency call request comprises a session initiation protocol (SIP) invite and the response comprises a SIP 200 OK.

20. The one or more computer storage devices of claim 15, wherein the terminating endpoint comprises a public safety answering point (PSAP) node; or the terminating endpoint comprises a node within a peering network between the originating endpoint and a PSAP node.

\* \* \* \* \*